(12) United States Patent
Zamora Esquivel et al.

(10) Patent No.: US 10,733,503 B2
(45) Date of Patent: Aug. 4, 2020

(54) TECHNOLOGIES FOR SHIFTED NEURAL NETWORKS

(71) Applicant: Intel Corporation, Santa Clara, CA (US)

(72) Inventors: Julio C. Zamora Esquivel, Zapopan (MX); Alejandro Ibarra von Borstel, Tlajomulco (MX); Carlos A. Flores Fajardo, Tlaquepaque (MX); Paulo Lopez Meyer, Zapopan (MX); Xiaoyun May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 902 days.

(21) Appl. No.: 15/046,894

(22) Filed: Feb. 18, 2016

(65) Prior Publication Data

US 2017/0243110 A1 Aug. 24, 2017

(51) Int. Cl.
*G06N 3/08* (2006.01)
*G06N 3/04* (2006.01)

(52) U.S. Cl.
CPC ............. *G06N 3/08* (2013.01); *G06N 3/0481* (2013.01)

(58) Field of Classification Search
CPC .................. G06N 3/08; G06N 3/0481
See application file for complete search history.

(56) References Cited

U.S. PATENT DOCUMENTS

| 5,060,278 | A | * | 10/1991 | Fukumizu | ............ | G06N 3/0454 |
|---|---|---|---|---|---|---|
| | | | | | | 382/157 |
| 5,712,922 | A | * | 1/1998 | Loewenthal | ......... | G06K 9/2036 |
| | | | | | | 382/155 |
| 2002/0087608 | A1 | * | 7/2002 | Rarick | .................... | G06F 7/548 |
| | | | | | | 708/440 |
| 2006/0224648 | A1 | * | 10/2006 | Johnson | ................ | G06F 1/0307 |
| | | | | | | 708/277 |
| 2007/0094176 | A1 | | 4/2007 | Goodnight et al. | | |
| 2015/0036920 | A1 | | 2/2015 | Wu et al. | | |
| 2015/0088795 | A1 | * | 3/2015 | Golovashkin | ............ | G06N 3/08 |
| | | | | | | 706/21 |
| 2015/0106310 | A1 | | 4/2015 | Birdwell et al. | | |
| 2015/0309961 | A1 | * | 10/2015 | Ozaki | ..................... | G06F 17/10 |
| | | | | | | 706/16 |

(Continued)

OTHER PUBLICATIONS

Amin et. al., "Piecewise linear approximation applied to nonlinear function of a neural network", Dec. 1997,IEE Proc.—Circuits Devices Syst., vol. 144. No. 6, p. 313-317 (Year: 1997).*

(Continued)

*Primary Examiner* — Li B. Zhen
*Assistant Examiner* — Selene A. Haedi
(74) *Attorney, Agent, or Firm* — Barnes & Thornburg LLP

(57) ABSTRACT

Technologies for using a shifted neural network include a compute device to determine a shift-based activation function of the shifted neural network. The shift-based activation function is a piecewise linear approximation of a transcendental activation function and is defined by a plurality of line segments such that a corresponding slope of each line segment is a power of two. The compute device further trains the shifted neural network based on shift-based input weights and the determined shift-based activation function.

21 Claims, 5 Drawing Sheets

(56) References Cited

U.S. PATENT DOCUMENTS

2015/0347870 A1 12/2015 Andreopoulos et al.
2016/0371362 A1* 12/2016 Jadhav ................. G06K 9/6222

OTHER PUBLICATIONS

Germain, "Horizontal Curve Formula", www.esf.edu/for/germain/Horizontal Curve Formulae.pdf (Year: 2012).*
You, Marsiglio, and Yue, "Piecewise linear approximation", Northwestern University: ChE 345 Spring 2015 course, Jun. 2015 (Year: 2015).*
"K-means clustering", downloaded from http://en.wikipedia/wiki/K-means_clustering, retrieved Dec. 2015.
"Gradient descent", downloaded from http://en.wikipedia/wiki/Gradient_descent, retrieved Sep. 29, 2015.
International search report for PCT application No. PCT/US2017/014101, dated May 4, 2017 (3 pages).
Written opinion for PCT application No. PCT/US2017/014101, dated May 4, 2017 (6 pages).
Schuyler Eldridge et al., "Towards General-Purpose Neural Network Computing," In: 2015 International Conference on Parallel Architecture and Compilation, Oct. 21, 2015, pp. 99-112 <URL http://ieeexplor.ieee.org/document/7429298>.

* cited by examiner

TECHNOLOGIES FOR SHIFTED NEURAL NETWORKS

BACKGROUND

The development and use of pattern recognition generally involves machine learning to recognize patterns in data by virtue, for example, of data regularities and/or irregularities. For example, a pattern recognition system may be "trained" to properly identify patterns by using training data that has pre-identified the relevant classes of the data points and/or may be used to recognize patterns in a previously unclassified set of data. One of the most common techniques for pattern recognition involves the use of Artificial Neural Networks (ANN), or simply neural networks, which were initially modeled after biological neural systems. Artificial Neural Networks are capable of learning and solving highly non-linear pattern recognition problems. In doing so, such networks typically involve the use of transcendental functions (e.g., sigmoid functions, hyperbolic tangent functions, etc.) and/or memory-intensive algorithms. Accordingly, the use of neural networks for pattern recognition is often limited or non-existent with wearable computing devices, low-power devices, and/or other hardware-limited devices (e.g., devices without a dedicated acceleration unit suitable for pattern recognition).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
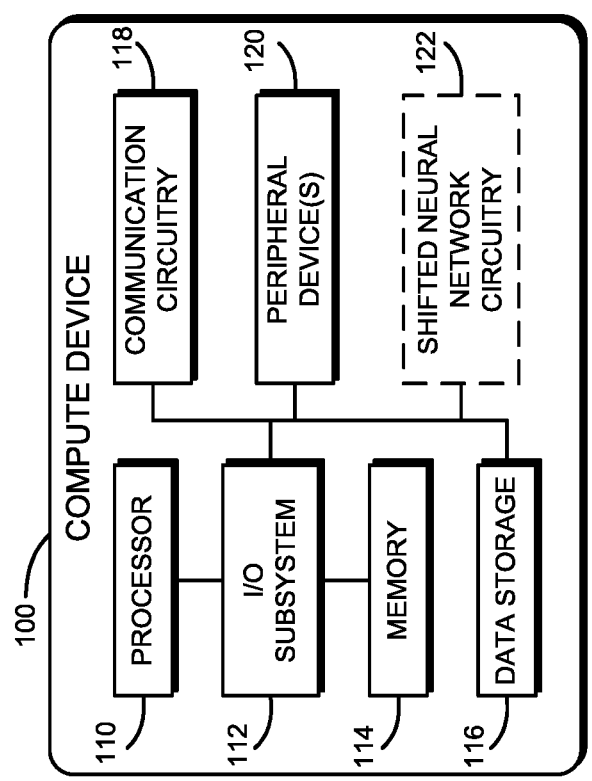
FIG. 1 is a simplified block diagram of at least one embodiment of a compute device for using a shifted neural network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for using a shifted neural network is shown. As described in detail below, in the illustrative embodiment, the compute device 100 utilizes a shifted neural network for machine learning, pattern recognition, and/or other suitable purposes. In some embodiments, the shifted neural network eliminates the use of double precision floating point units in neural network calculations, eliminates the use of transcendental functions, eliminates the need for multiplication operations in the feed-forward layers of a typical neural network, avoids input pattern normalization, and/or reduces the memory footprint of the neural network relative to typical neural networks. Accordingly, in some embodiments, hardware for floating-point operations and/or multiplication may not be included in the circuitry for shifted neural network computations. Further, the processor 110 of the compute device 100 may consume less power and/or process the neural network computations more quickly with the shifted neural network described herein.

As described below, the compute device 100 determines a shift-based activation function of the shifted neural network (e.g., a piecewise linear approximation of transcendental activation function) and stores the shifted neural network weights as bitwise shifts (e.g., as four bit values) of the input values. The compute device 100 may train the shifted neural network based on the shift-based input weights and the shift-based activation function and/or apply the shifted neural network (e.g., for pattern recognition). Although the shifted neural network techniques are described herein as being performed by the same compute device 100, it should be appreciated that one or more of the techniques may be performed by various compute devices 100 in other embodiments. For example, in some embodiments, one compute device 100 may determine the shift-based activation function and train the shifted neural network, whereas another compute device 100 may apply the shifted neural network (e.g., a wearable computing device).

The compute device 100 may be embodied as any type of computing device capable of performing the functions described herein. For example, the compute device 100 may be embodied as a wearable computing device, smartphone, cellular phone, personal digital assistant, mobile Internet device, tablet computer, netbook, notebook, Ultrabook™, laptop computer, desktop computer, server, and/or any other mobile computing/communication device. In the illustrative embodiment, the compute device 100 is embodied as a wearable computing device or other mobile computing device having relatively limited hardware resources. As shown in FIG. 1, the illustrative compute device 100 includes a processor 110, an input/output ("I/O") subsystem 112, a memory 114, a data storage 116, a communication circuitry 118, and one or more peripheral devices 120. Additionally, in some embodiments, the compute device 100 may include a shifted neural network circuitry 122. Of course, the compute device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the compute device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the compute device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the compute device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the compute device 100 as described herein.

The communication circuitry 118 may be embodied as any communication circuit, device, or collection thereof, capable of enabling communications between the compute device 100 and other devices over a network. The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the compute device 100.

As indicated above, in some embodiments, the compute device 100 may include a shifted neural network circuitry 122 configured to perform one or more functions related to the shifted neural network (e.g., pattern recognition). In some embodiments, the shifted neural network circuitry 122 may include various circuit elements/components to perform operations for the shifted neural network (e.g., multiplexers, summers, bit shifters, etc.). Such components may, for example, be discrete and/or embedded on an integrated circuit depending on the particular embodiment. Further, in some embodiments, floating-point circuitry and/or multiplication circuit components may be omitted from the shifted neural network circuitry 122.

Figure 2:
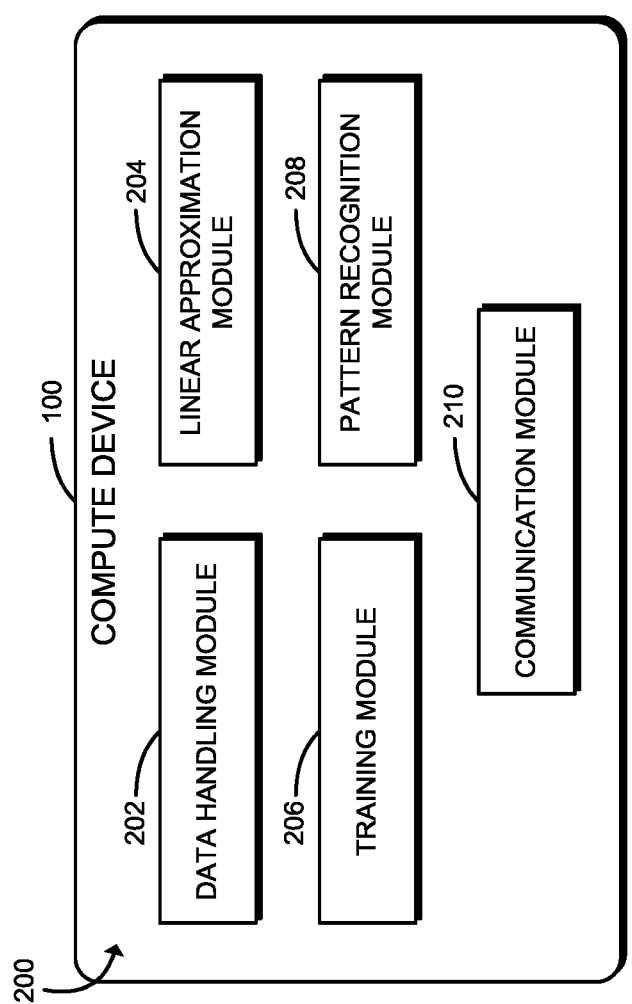
FIG. 2 is a simplified block diagram of at least one embodiment of an environment of a compute device of FIG. 1.

Referring now to FIG. 2, in use, the compute device 100 establishes an environment for using a shifted neural network. The illustrative environment 200 includes a data handling module 202, a linear approximation module 204, a training module 206, a pattern recognition module 208, and a communication module 210. The various modules of the environment 200 may be embodied as hardware, software, firmware, or a combination thereof. For example, the various modules, logic, and other components of the environment 200 may form a portion of, or otherwise be established by, the processor 110 or other hardware components of the compute device 100. As such, in some embodiments, one or more of the modules of the environment 200 may be embodied as circuitry or collection of electrical devices (e.g., a data handling circuitry, a linear approximation circuitry, a training circuitry, a pattern recognition circuitry, and/or a communication circuitry). Additionally, in some embodiments, one or more of the illustrative modules may form a portion of another module and/or one or more of the illustrative modules may be independent of one another.

The data handling module 202 is configured to identify, receive, and/or retrieve input values by which to train the shifted neural network and/or to which to apply the shifted neural network. For example, in some embodiments, the data handling module 202 may identify/retrieve a set of predefined image patterns for recognition (e.g., Mixed National Institute of Standards and Technology (MNIST) database or other image patterns approved by a standards body). Further, the data handling module 202 may identify and/or retrieve the set of shift-based input weights for each neuron of the shifted neural network at a given point in time. As described herein, in the illustrative embodiment, the weights may be stored as four bits in memory (e.g., in a four-bit memory region) such that three of the bits are indicative of an amount of bitwise shift of the corresponding weight and the other bit is indicative of a sign of the weight. Accordingly, in the illustrative embodiments, each of the weights is essentially a power of two (i.e., may be expressed as $2^n$ for some integer n) if multiplication were to be used instead of a bitwise shift operation.

Figure 5:
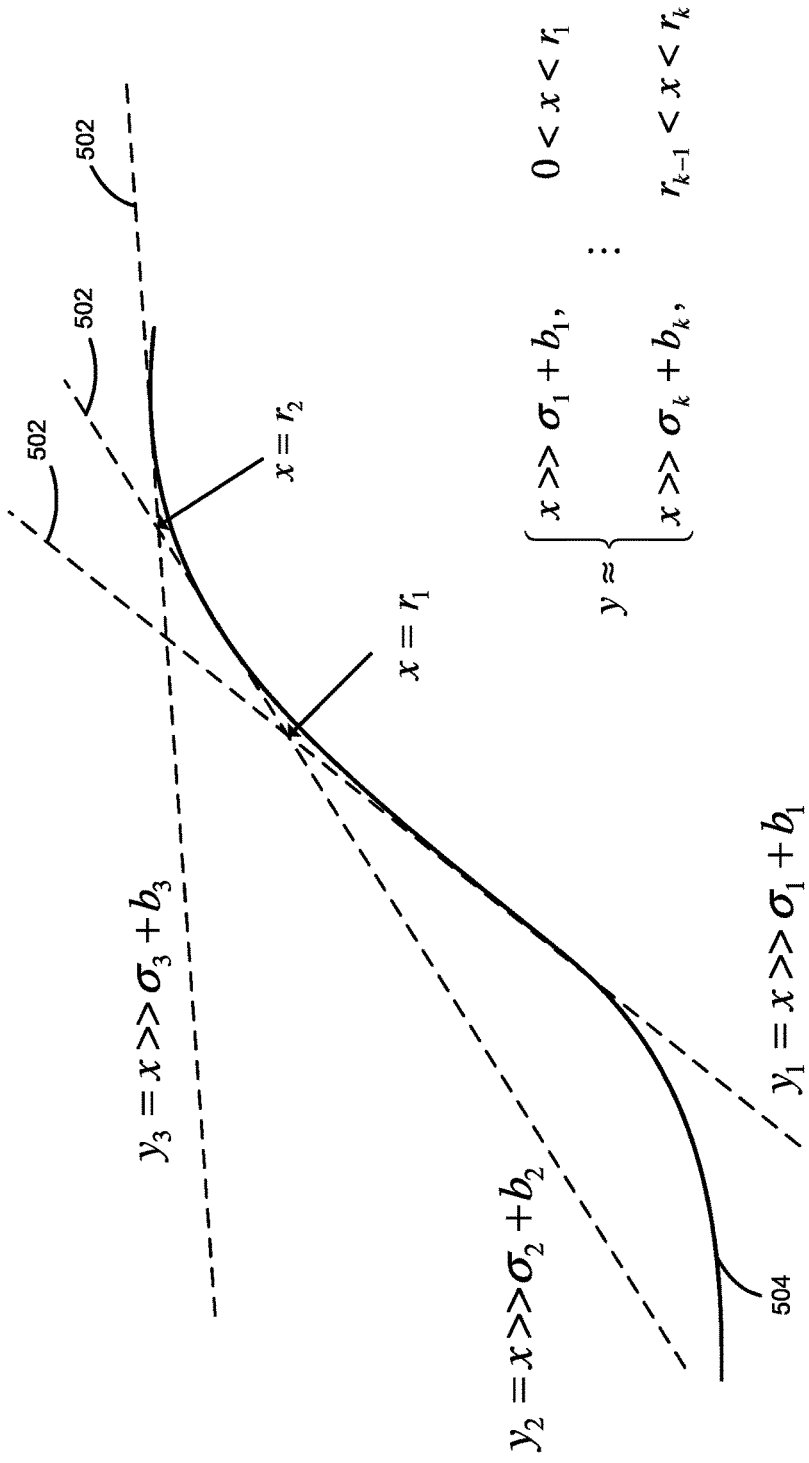
FIG. 5 is a simplified graph illustrating the determination of a piecewise linear approximation of a transcendental activation function for the shifted neural network.

The linear approximation module 204 is configured to determine a shift-based activation function of the shifted neural network. In particular, in the illustrative embodiment, the shift-based activation function is a piecewise linear approximation of a transcendental activation function (see FIG. 5) and is defined by a plurality of line segments such that the slope of each line segment is a power of two. Accordingly, in the illustrative embodiment, the slopes may be stored and/or calculated as bitwise shifts. The transcendental functions may be embodied, for example, as a sigmoid function or a hyberbolic tangent function depending on the desired operating range. As described below, in some embodiments, the shift-based activation function may be determined based on k-means clustering.

The training module 206 is configured to train the shifted neural network based on the shift-based input weights and the determined shift-based activation function. It should be appreciated that the training module 206 may utilize any suitable techniques, algorithms, and/or mechanisms for training the shifted neural network. For example, in some embodiments, the training module 206 may utilize many neurons and variations in the shift-based weights iteratively in order to distinguish/label various classes of data. Depending on the particular embodiment, the training module 206 may utilize supervised and/or unsupervised training techniques.

The pattern recognition module 208 is configured to apply the shifted neural network to various inputs for pattern recognition. For example, in some embodiments, the pattern recognition module 208 may apply the trained shifted neural network to a set of unclassified input data points in order to determine the corresponding classes of those data points. As indicated above, in some embodiments, various techniques described herein may be employed on different devices. For example, one compute device 100 may perform the training of the shifted neural network and another compute device 100 may apply the shifted neural network (e.g., for pattern recognition).

The communication module 210 handles the communication between the compute device 100 and other computing devices. For example, in some embodiments, the compute device 100 may transmit the shift-based activation function, shift-based weights, and/or other data associated with the shifted neural network to another compute device 100.

Figure 3:
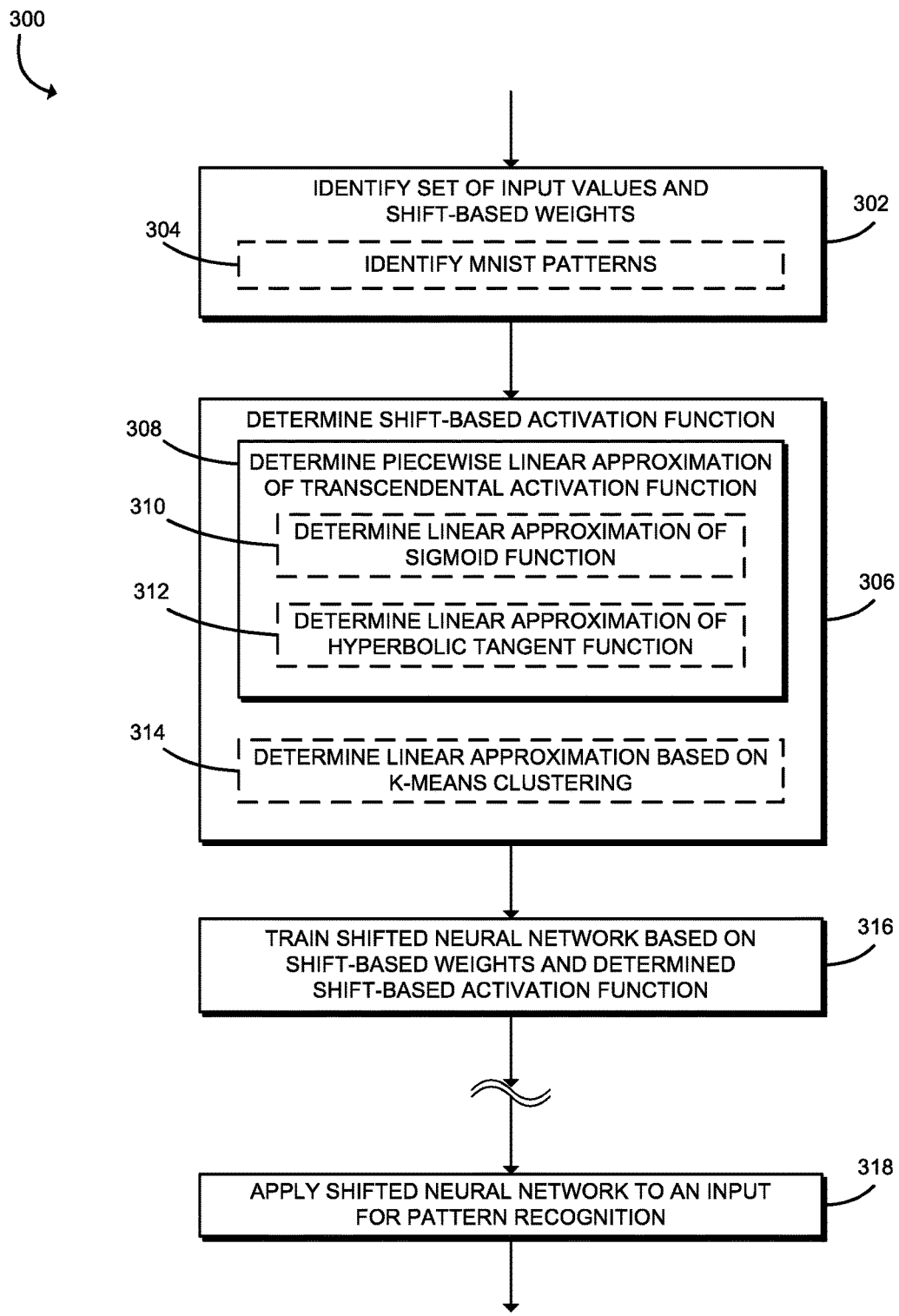
FIG. 3 is a simplified flow diagram of at least one embodiment of a method for using a shifted neural network that may be executed by the compute device of FIG. 1.

Referring now to FIG. 3, in use, the compute device 100 may execute a method 300 for use of a shifted neural network. The illustrative method 300 begins with block 302 in which the compute device 100 identifies, receives, and/or retrieves a set of input values by which to train the shifted neural network and/or to which to apply the shifted neural network. For example, in block 304, the compute device 100 may identify/receive one or more image patterns such as MNIST patterns. Of course, in other embodiments, it should be appreciated that the techniques described herein may be applied to non-image data.

In typical neural network implementations, the input values are often normalized (e.g., from the signed char range of (−128,127) to the floating-point range of (−1.0f, 1.0f)) to reach consistency within the data's dynamic range, which results in floating-point multiplications in the convolutional neural network engine. However, in the illustrative embodiment, the input values may be utilized without normalization in the shifted neural network, which may save memory, time, operations, and/or power.

In block 306, the compute device 100 determines a shift-based activation function of the shifted neural network. In particular, in block 308, the compute device 100 determines a piecewise linear approximation of a transcendental activation function such that the piecewise linear approximation is defined by a set of line segments, each having a slope that is a power of two (and therefore calculable by virtue of bitwise shift operations). For example, the compute device 100 may generate a linear approximation of a sigmoid function in block 310 or generate a linear approximation of a hyperbolic tangent function in block 312 (see, for example, function 504 of FIG. 5). Of course, it should be appreciated that the compute device 100 may utilize another transcendental function suitable for the performance of the functions described herein in other embodiments.

Figure 4:
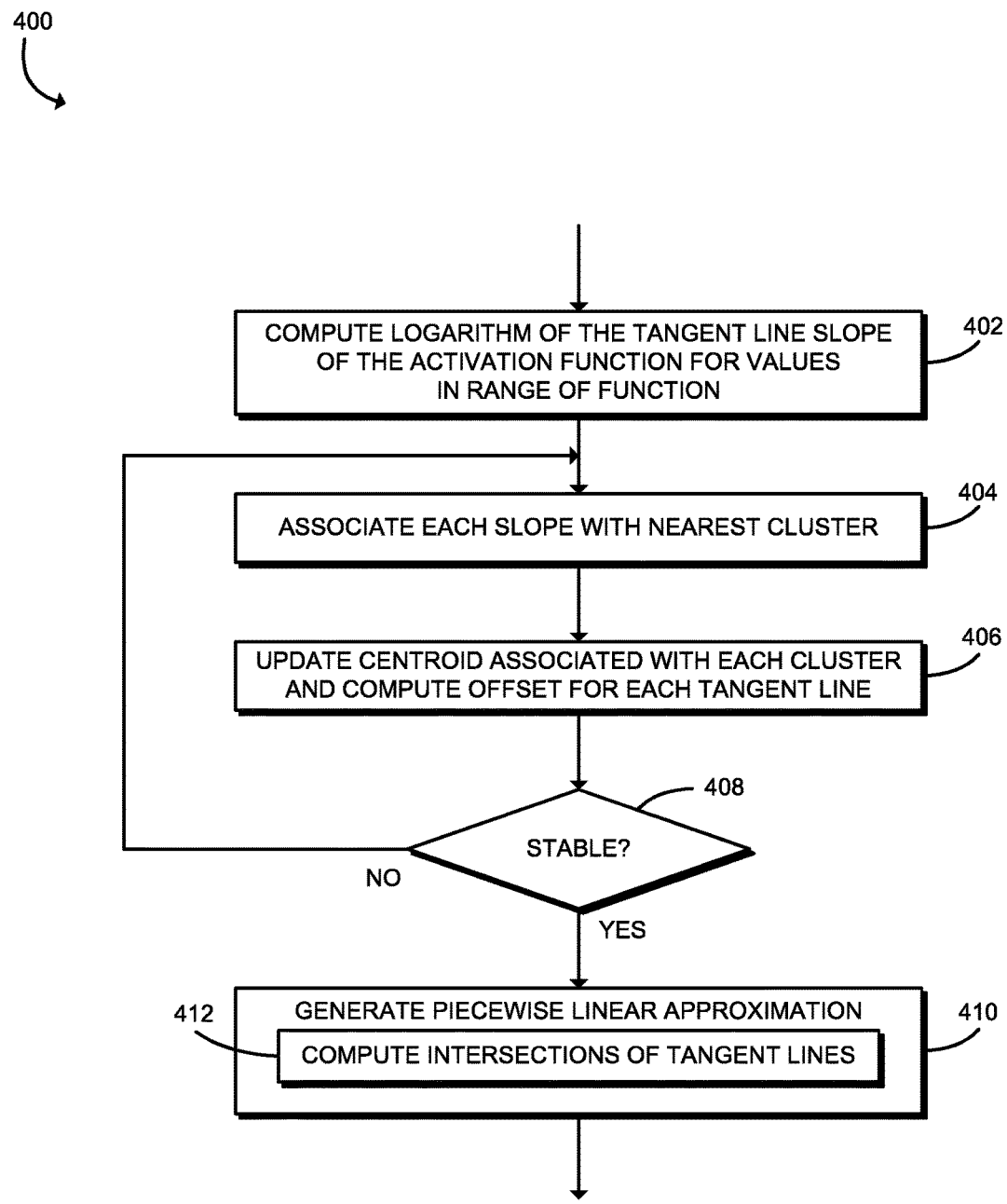
FIG. 4 is a simplified flow diagram of at least one embodiment of a method of determining a shift-based activation function for the shifted neural network.

In some embodiments, in block 314, the compute device 100 may generate the linear approximation of the transcendental activation function based on k-means clustering. To do so, the compute device 100 may execute a method 400 of FIG. 4. The illustrative method 400 begins with block 402 in which the compute device 100 computes a slope value as a base-two logarithm of a tangent line (see, for example, tangent lines 502 of FIG. 5) of the transcendental activation function for each function value of a plurality of function values in the range of the transcendental activation function (see, for example, function 504 of FIG. 5). More formally, the compute device 100 may determine $$y_j = Af\left(\frac{x_j}{B}\right) \text{ and } \sigma_j = -\log_2\left(Af'\left(\frac{x_j}{B}\right)\right),$$

where j is an index, A and B are scale constants, $f$ is the transcendental activation function, $y_j$ is the corresponding output value, $x_j$ is the corresponding input value, and $\sigma_j$ is a slope of the function. It should be appreciated that, in some embodiments, the tangent lines may be initialized randomly or according to some other suitable algorithm.

In block 404, the compute device 100 associates each slope with the nearest cluster. In other words, the compute device 100 determines the "distance" of each slope value to each of the centroid values and associates the slope with the nearest cluster. More formally, the compute device 100 may determine $$S_j^{(t)} = \{\sigma_P : \|\sigma_P - m_i^{(t)}\| < \|\sigma_P - m_j^{(t)}\|, \forall\, 1 \le j \le k\},$$

where $S_j^{(t)}$ is a particular set/cluster (of the k clusters), $\sigma_p$ is a corresponding slope of the function, $m_i^{(t)}$ and $m_j^{(t)}$ are means of the corresponding clusters, and p, j, i, and k are indices.

In block 406, the compute device 100 updates the centroid (e.g., mean) associated with each cluster and computes the offset for each tangent line. More formally, the compute device 100 may determine where $$b_i = \frac{1}{|S_i^{(t)}|} \sum_{\sigma_j \in S_i^{(t)}} y_j - \frac{x_j}{2^{m_i}} \text{ and } m_i^{(t+1)} = \text{Round}\left(\frac{1}{|S_i^{(t)}|} \sum_{\sigma_j \in S_i^{(t)}} \sigma_j\right),$$

where $b_i$ is an offset of the corresponding tangent line relative to the origin, $S_i^{(t)}$ is a particular set/cluster, $\sigma_j$ is a corresponding slope of the function, $m_i^{(t+1)}$ is a mean of the corresponding cluster, $y_j$ is the corresponding output value, and $x_j$ is the corresponding input value.

In block 408, the compute device 100 determines whether each centroid value is stable. In other words, the compute device 100 determines whether the centroid values of the clusters are unchanged (or minimally changed) relative to the previous iteration. More formally, the compute device 100 may determine whether $m_i^{(t+1)} = m_i^{(t)}$, $\forall 1 \leq i \leq k-1$. If the centroid values are not stable, the method 400 returns to block 404 in which the compute device 100 again determines the nearest cluster to each of the slopes and re-associates the slopes accordingly (i.e., to the extent there is a change). However, if the compute device 100 determines that the centroid values are stable, the compute device 100 determines the piecewise linear approximation in block 410. In doing so, in the illustrative embodiment, the compute device 100 computes the intersections of the tangent lines in block 412. More formally, the compute device 100 may determine the intersections according to $$r_i = m_i m_{i+1} \left( \frac{b_i - b_{i+1}}{m_i - m_{i+1}} \right), \forall\, 1 \leq i \leq k-1$$

and may determine the piecewise linear approximation according to $$y \approx \begin{cases} x \gg \sigma_1 + b_1, & 0 < x < r_1 \\ \vdots & \\ x \gg \sigma_k + b_k, & r_{k-1} < x < r_k \end{cases}$$

wherein $r_i$ is an intersection of two tangent lines and $\gg$ is a bitwise shift operator. It should be appreciated that the techniques described herein may be employed to map a continuous neural network into a shifted neural network. In some embodiments, the shifted neural network may have significant memory compression (e.g., eight times) relative to typical neural networks. Further, in some embodiments, the shifted neural network may permit an implementation on a small SoC by avoiding floating-point and integer multiplication operations as described above.

Referring back to FIG. 3, in block 316, the compute device 100 trains the shifted neural network based on the relevant shift-based weights and the determined shift-based activation function. As indicated above, it should be appreciated that the compute device 100 may utilize any suitable techniques, algorithms, and/or mechanisms for training the shifted neural network. For example, in some embodiments, the compute device 100 may utilize many neurons and variations in the shift-based weights iteratively in order to distinguish/label various classes of data.

In typical neural networks, it should be appreciated that the neuron weights may be accumulated according to $s = \Sigma w_i x_i$, where $w_i$ is a weight and $x_i$ is the corresponding input. In other words, the input values are multiplied by various weights and summed. However, in the illustrative embodiment, each of the weights is indicative of an amount by which to perform a bitwise shift on the input value. Accordingly, in memory, the compute device 100 may utilize three bits to store the shift amount (e.g., 0, 1, 2, 3, 4, 5, 6, or 7) and one bit for the sign. As such, in the illustrative embodiment, each of the weights is a power of two (e.g., −128, −64, −32, −16, −8, −4, −2, −1, 1, 2, 4, 8, 16, 32, 64, or 128). It should be appreciated that such a data representation and operations may represent a significant memory compression relative to integer and/or floating-point multiplication associated with a convolutional engine.

In block 318, the compute device 100 applies the shifted neural network to various inputs for pattern recognition. For example, in some embodiments, the compute device 100 may apply the trained shifted neural network to a set of unclassified input data points in order to determine the corresponding classes of those data points. As indicated above, in some embodiments, it should be appreciated that one compute device 100 may perform the training of the shifted neural network and another compute device 100 may apply the shifted neural network (e.g., for pattern recognition).

EXAMPLES

Illustrative examples of the technologies disclosed herein are provided below. An embodiment of the technologies may include any one or more, and any combination of, the examples described below.

Example 1 includes a compute device for use of a shifted neural network, the compute device comprising a linear approximation module to determine a shift-based activation function of the shifted neural network, wherein the shift-based activation function is a piecewise linear approximation of a transcendental activation function and is defined by a plurality of line segments, and wherein a corresponding slope of each line segment is a power of two; and a training module to train the shifted neural network based on shift-based input weights and the determined shift-based activation function.

Example 2 includes the subject matter of Example 1, and further including a data handling module to identify a set of input values and a set of shift-based input weights for each neuron of the shifted neural network.

Example 3 includes the subject matter of any of Examples 1 and 2, and wherein the set of input values comprises a set of predefined image patterns for recognition.

Example 4 includes the subject matter of any of Examples 1-3, and wherein the set of predefined image patterns comprises a set of image patterns approved by a standards body.

Example 5 includes the subject matter of any of Examples 1-4, and wherein the transcendental activation function comprises a sigmoid function.

Example 6 includes the subject matter of any of Examples 1-5, and wherein the transcendental activation function comprises a hyperbolic tangent function.

Example 7 includes the subject matter of any of Examples 1-6, and wherein to determine the shift-based activation function comprises to determine the shift-based activation function based on k-means clustering.

Example 8 includes the subject matter of any of Examples 1-7, and wherein to determine the shift-based activation function based on k-means clustering comprises to compute a slope value as a base-two logarithm of a tangent line of the transcendental activation function for each function value of a plurality of function values in the range of the transcendental activation function; associate each slope value with a corresponding nearest cluster; and update a centroid associated with each cluster.

Example 9 includes the subject matter of any of Examples 1-8, and wherein to determine the shift-based activation function based on k-means clustering further comprises to compute an offset of the tangent line relative to an origin.

Example 10 includes the subject matter of any of Examples 1-9, and wherein to determine the shift-based activation function based on k-means clustering further comprises to compute intersections of the tangent lines in response to a determination that each centroid value is stable.

Example 11 includes the subject matter of any of Examples 1-10, and wherein to determine the shift-based activation function comprises to generate the piecewise linear approximation according to $$y \approx \begin{cases} x \gg \sigma_1 + b_1, & 0 < x < r_1 \\ \vdots & \\ x \gg \sigma_k + b_k, & r_{k-1} < x < r_k \end{cases}$$

wherein x is an input value, $\sigma_i$ is the scope slope value of the $i^{th}$ tangent line, $b_i$ is an offset of the $i^{th}$ tangent line relative to the transcendental activation function, $r_i$ is an intersection of two tangent lines, and $\gg$ is a bitwise shift operator.

Example 12 includes the subject matter of any of Examples 1-11, and further including a pattern recognition module to apply the shifted neural network to an input for pattern recognition.

Example 13 includes the subject matter of any of Examples 1-12, and wherein each corresponding slope is computed by a bitwise shift operation.

Example 14 includes the subject matter of any of Examples 1-13, and wherein each of the input weights is stored in a four-bit memory region; and wherein three bits of the four-bit memory region store a value associated with an amount of bitwise shift of the corresponding input weight and one bit is indicative of a sign of the weight.

Example 15 includes a method for use of a shifted neural network, the method comprising determining, by a compute device, a shift-based activation function of the shifted neural network, wherein the shift-based activation function is a piecewise linear approximation of a transcendental activation function and is defined by a plurality of line segments, and wherein a corresponding slope of each line segment is a power of two; and training, by the compute device, the shifted neural network based on shift-based input weights and the determined shift-based activation function.

Example 16 includes the subject matter of Example 15, and further including identifying, by the compute device, a set of input values and a set of shift-based input weights for each neuron of the shifted neural network.

Example 17 includes the subject matter of any of Examples 15 and 16, and wherein the set of input values comprises a set of predefined image patterns for recognition.

Example 18 includes the subject matter of any of Examples 15-17, and wherein the set of predefined image patterns comprises a set of image patterns approved by a standards body.

Example 19 includes the subject matter of any of Examples 15-18, and wherein the transcendental activation function comprises a sigmoid function.

Example 20 includes the subject matter of any of Examples 15-19, and wherein the transcendental activation function comprises a hyperbolic tangent function.

Example 21 includes the subject matter of any of Examples 15-20, and wherein determining the shift-based activation function comprises determining the shift-based activation function based on k-means clustering.

Example 22 includes the subject matter of any of Examples 15-21, and wherein determining the shift-based activation function based on k-means clustering comprises computing a slope value as a base-two logarithm of a tangent line of the transcendental activation function for each function value of a plurality of function values in the range of the transcendental activation function; associating each slope value with a corresponding nearest cluster; and updating a centroid associated with each cluster.

Example 23 includes the subject matter of any of Examples 15-22, and wherein determining the shift-based activation function based on k-means clustering further comprises computing an offset of the tangent line relative to an origin.

Example 24 includes the subject matter of any of Examples 15-23, and wherein determining the shift-based activation function based on k-means clustering further comprises computing intersections of the tangent lines in response to a determination that each centroid value is stable.

Example 25 includes the subject matter of any of Examples 15-24, and wherein determining the shift-based activation function comprises generating the piecewise linear approximation according to $$y \approx \begin{cases} x \gg \sigma_1 + b_1, & 0 < x < r_1 \\ \vdots & \\ x \gg \sigma_k + b_k, & r_{k-1} < x < r_k \end{cases}$$

wherein x is an input value, $\sigma_i$ is the slope value of the $i^{th}$ tangent line, $b_i$ is an offset of the $i^{th}$ tangent line relative to the transcendental activation function, $r_i$ is an intersection of two tangent lines, and $\gg$ is a bitwise shift operator.

Example 26 includes the subject matter of any of Examples 15-25, and further including applying, by the compute device, the shifted neural network to an input for pattern recognition.

Example 27 includes the subject matter of any of Examples 15-26, and wherein each corresponding slope is computed by a bitwise shift operation.

Example 28 includes the subject matter of any of Examples 15-27, and wherein each of the input weights is stored in a four-bit memory region; and wherein three bits of the four-bit memory region store a value associated with an amount of bitwise shift of the corresponding input weight and one bit is indicative of a sign of the weight.

Example 29 includes a computing device comprising a processor; and a memory having stored therein a plurality of instructions that when executed by the processor cause the computing device to perform the method of any of Examples 15-28.

Example 30 includes one or more machine-readable storage media comprising a plurality of instructions stored thereon that in response to being executed result in a computing device performing the method of any of Examples 15-28.

Example 31 includes a computing device comprising means for performing the method of any of Examples 15-28.

Example 32 includes a compute device for use of a shifted neural network, the compute device comprising means for determining a shift-based activation function of the shifted neural network, wherein the shift-based activation function is a piecewise linear approximation of a transcendental activation function and is defined by a plurality of line segments, and wherein a corresponding slope of each line segment is a power of two; and means for training the shifted neural network based on shift-based input weights and the determined shift-based activation function.

Example 33 includes the subject matter of Example 32, and further including means for identifying a set of input values and a set of shift-based input weights for each neuron of the shifted neural network.

Example 34 includes the subject matter of any of Examples 32 and 33, and wherein the set of input values comprises a set of predefined image patterns for recognition.

Example 35 includes the subject matter of any of Examples 32-34, and wherein the set of predefined image patterns comprises a set of image patterns approved by a standards body.

Example 36 includes the subject matter of any of Examples 32-35, and wherein the transcendental activation function comprises a sigmoid function.

Example 37 includes the subject matter of any of Examples 32-36, and wherein the transcendental activation function comprises a hyperbolic tangent function.

Example 38 includes the subject matter of any of Examples 32-37, and wherein the means for determining the shift-based activation function comprises means for determining the shift-based activation function based on k-means clustering.

Example 39 includes the subject matter of any of Examples 32-38, and wherein the means for determining the shift-based activation function based on k-means clustering comprises means for computing a slope value as a base-two logarithm of a tangent line of the transcendental activation function for each function value of a plurality of function values in the range of the transcendental activation function; means for associating each slope value with a corresponding nearest cluster; and means for updating a centroid associated with each cluster.

Example 40 includes the subject matter of any of Examples 32-39, and wherein the means for determining the shift-based activation function based on k-means clustering further comprises means for computing an offset of the tangent line relative to an origin.

Example 41 includes the subject matter of any of Examples 32-40, and wherein the means for determining the shift-based activation function based on k-means clustering further comprises means for computing intersections of the tangent lines in response to a determination that each centroid value is stable.

Example 42 includes the subject matter of any of Examples 32-41, and wherein the means for determining the shift-based activation function comprises means for generating the piecewise linear approximation according to $$y \approx \begin{cases} x \gg \sigma_1 + b_1, & 0 < x < r_1 \\ \vdots \\ x \gg \sigma_k + b_k, & r_{k-1} < x < r_k \end{cases}$$

wherein x is an input value, $\sigma_i$ is the slope value of the $i^{th}$ tangent line, $b_i$ is an offset of the $i^{th}$ tangent line relative to the transcendental activation function, $r_i$ is an intersection of two tangent lines, and $\gg$ is a bitwise shift operator.

Example 43 includes the subject matter of any of Examples 32-42, and further including means for applying the shifted neural network to an input for pattern recognition.

Example 44 includes the subject matter of any of Examples 32-43, and wherein each corresponding slope is computed by a bitwise shift operation.

Example 45 includes the subject matter of any of Examples 32-44, and wherein each of the input weights is stored in a four-bit memory region; and wherein three bits of the four-bit memory region store a value associated with an amount of bitwise shift of the corresponding input weight and one bit is indicative of a sign of the weight.

The invention claimed is:

1. A compute device for use of a shifted neural network, the compute device comprising:
   a linear approximation module to determine a shift-based activation function of the shifted neural network, wherein the shift-based activation function is a piecewise linear approximation of a transcendental activation function and is defined by a plurality of line segments, and wherein a corresponding slope of each line segment is a power of two; and
   a training module to train the shifted neural network based on shift-based input weights and the determined shift-based activation function,
   wherein to determine the shift-based activation function comprises to: (i) compute a slope value as a base-two logarithm of a tangent line of the transcendental activation function for each function value of a plurality of function values in the range of the transcendental activation function, (ii) associate each slope value with a corresponding nearest cluster, and (iii) update a centroid associated with each cluster.

2. The compute device of claim 1, further comprising a data handling module to identify a set of input values and a set of shift-based input weights for each neuron of the shifted neural network.

3. The compute device of claim 2, wherein the set of input values comprises a set of predefined image patterns for recognition.

4. The compute device of claim 1, wherein the transcendental activation function comprises a sigmoid function.

5. The compute device of claim 1, wherein the transcendental activation function comprises a hyperbolic tangent function.

6. The compute device of claim 1, wherein to determine the shift-based activation function based on k-means clustering further comprises to compute an offset of the tangent line relative to an origin.

7. The compute device of claim 1, wherein to determine the shift-based activation function based on k-means clustering further comprises to compute intersections of the tangent lines in response to a determination that each centroid value is stable.

8. The compute device of claim 7, wherein to determine the shift-based activation function comprises to generate the piecewise linear approximation according to $$y \approx \begin{cases} x \gg \sigma_1 + b_1, & 0 < x < r_1 \\ \vdots \\ x \gg \sigma_k + b_k, & r_{k-1} < x < r_k \end{cases}$$

wherein x is an input value, $\sigma_i$ is the slope value of the $i^{th}$ tangent line, $b_i$ is an offset of the $i^{th}$ tangent line relative to the transcendental activation function, $r_i$ is an intersection of two tangent lines, and $\gg$ is a bitwise shift operator.

9. The compute device of claim 1, further comprising a pattern recognition module to apply the shifted neural network to an input for pattern recognition.

10. The compute device of claim 1, wherein each corresponding slope is computed by a bitwise shift operation.

11. The compute device of claim 1, wherein each of the input weights is stored in a four-bit memory region; and
wherein three bits of the four-bit memory region store a value associated with an amount of bitwise shift of the corresponding input weight and one bit is indicative of a sign of the weight.

12. One or more non-transitory, machine-readable storage media comprising a plurality of instructions stored thereon that, in response execution by a compute device, causes the compute device to:
determine a shift-based activation function of the shifted neural network, wherein the shift-based activation function is a piecewise linear approximation of a transcendental activation function and is defined by a plurality of line segments, and wherein a corresponding slope of each line segment is a power of two; and
train the shifted neural network based on shift-based input weights and the determined shift-based activation function,
wherein to determine the shift-based activation function comprises to (i) compute a slope value as a base-two logarithm of a tangent line of the transcendental activation function for each function value of a plurality of function values in the range of the transcendental activation function, (ii) associate each slope value with a corresponding nearest cluster, and (iii) update a centroid associated with each cluster, to determine the shift-based activation function based on k-means clustering.

13. The one or more non-transitory, machine-readable storage media of claim 12, wherein the plurality of instructions further causes the compute device to identify a set of input values and a set of shift-based input weights for each neuron of the shifted neural network,
wherein the set of input values comprises a set of predefined image patterns for recognition.

14. The one or more non-transitory, machine-readable storage media of claim 12, wherein the transcendental activation function comprises one of a sigmoid function or a hyperbolic tangent function.

15. The one or more non-transitory, machine-readable storage media of claim 12, wherein to determine the shift-based activation function based on k-means clustering further comprises to:
compute an offset of the tangent line relative to an origin; and
compute intersections of the tangent lines in response to a determination that each centroid value is stable.

16. The one or more non-transitory, machine-readable storage media of claim 15, wherein to determine the shift-based activation function comprises to generate the piecewise linear approximation according to $$y \approx \begin{cases} x \gg \sigma_1 + b_1, & 0 < x < r_1 \\ \vdots & \\ x \gg \sigma_k + b_k, & r_{k-1} < x < r_k \end{cases}$$

wherein x is an input value, $\sigma_i$ is the slope value of the $i^{th}$ tangent line, $b_i$ is an offset of the $i^{th}$ tangent line relative to the transcendental activation function, $r_i$ is an intersection of two tangent lines, and $\gg$ is a bitwise shift operator.

17. The one or more non-transitory, machine-readable storage media of claim 12, wherein each corresponding slope is computed by a bitwise shift operation.

18. A method for use of a shifted neural network, the method comprising:
determining, by a compute device, a shift-based activation function of the shifted neural network, wherein the shift-based activation function is a piecewise linear approximation of a transcendental activation function and is defined by a plurality of line segments, and wherein a corresponding slope of each line segment is a power of two; and
training, by the compute device, the shifted neural network based on shift-based input weights and the determined shift-based activation function,
wherein determining the shift-based activation function comprises (i) computing a slope value as a base-two logarithm of a tangent line of the transcendental activation function for each function value of a plurality of function values in the range of the transcendental activation function, (ii) associating each slope value with a corresponding nearest cluster, and (iii) updating a centroid associated with each cluster.

19. The method of claim 18, further comprising identifying, by the compute device, a set of input values and a set of shift-based input weights for each neuron of the shifted neural network.

20. The method of claim 18, wherein determining the shift-based activation function based on k-means clustering further comprises:
computing an offset of the tangent line relative to an origin; and
computing intersections of the tangent lines in response to a determination that each centroid value is stable.

21. The method of claim 20, wherein determining the shift-based activation function comprises generating the piecewise linear approximation according to $$y \approx \begin{cases} x \gg \sigma_1 + b_1, & 0 < x < r_1 \\ \vdots & \\ x \gg \sigma_k + b_k, & r_{k-1} < x < r_k \end{cases}$$

wherein x is an input value, $\sigma_i$ is the slope value of the $i^{th}$ tangent line, $b_i$ is an offset of the $i^{th}$ tangent line relative to the transcendental activation function, $r_i$ is an intersection of two tangent lines, and $\gg$ is a bitwise shift operator.

* * * * *